Sept. 21, 1965 J. C. MALLINSON 3,207,912
MULTI-APERTURE CORE LOGIC CIRCUIT
Filed Dec. 7, 1960
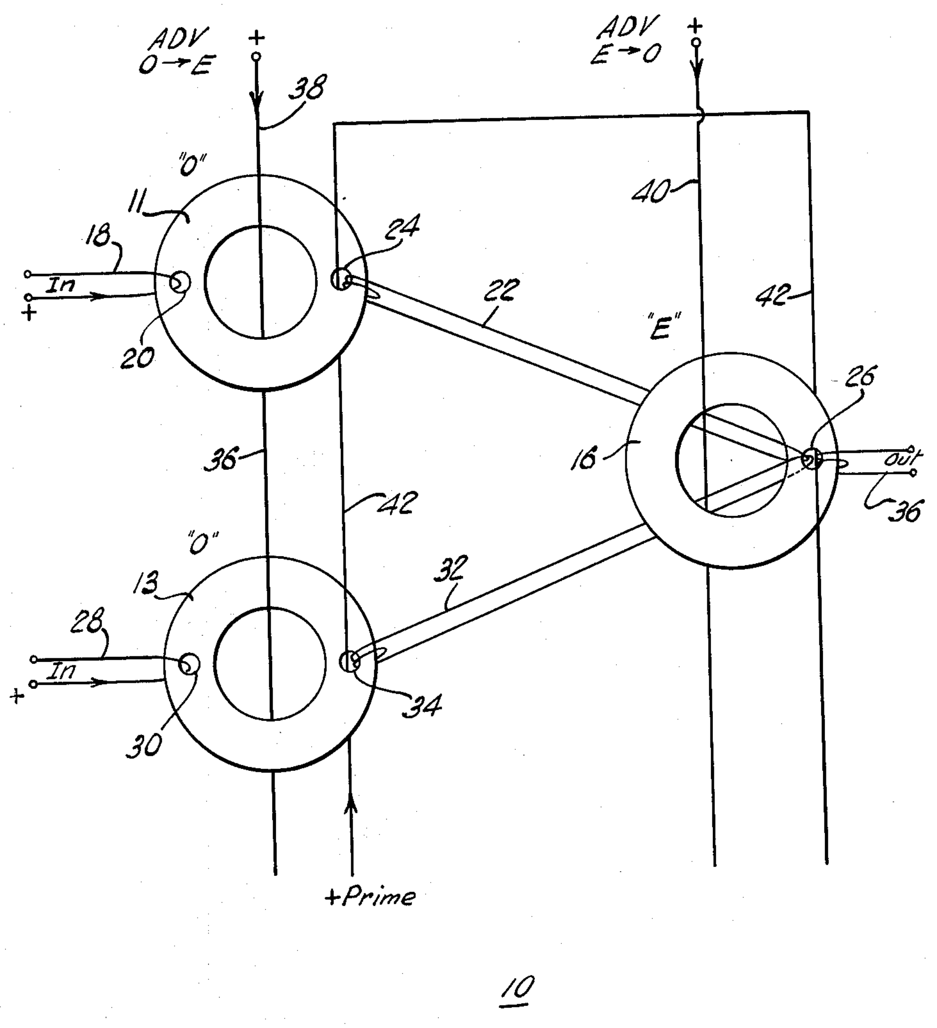
INVENTOR
JOHN C. MALLINSON
BY
Curtis, Morris & Safford
ATTORNEYS.

3,207,912

MULTI-APERTURE CORE LOGIC CIRCUIT

John C. Mallinson, Harrisburg, Pa., assignor to AMP Incorporated, Harrisburg, Pa.

Filed Dec. 7, 1960, Ser. No. 74,405
5 Claims. (Cl. 307—88)

This invention relates to a logic circuit using magnetic cores, and more particularly to an "AND" gate using multi-aperture ferrite cores.

An object of this invention is to provide a simple and inexpensive logic circuit.

A more specific object is to provide an improved and simplified AND gate using magnetic cores.

A further object is to provide a logic circuit of this kind which is compatible with existing equipment.

These and other objects of the invention will in part be understood from and in part pointed out in the following description.

An "AND" gate is a logic element or circuit having two or more inputs and an output. If all of its inputs receive a signal, the unit will generate a signal at its output to indicate this. However, if one or more input signals are mising, there will be no output signal. An element performing this function is particularly useful in digital computers and in fact a single computer may use hudreds of such elements, each having a number of inputs.

Previously there have been developed a number of electrical circuits which operate as AND gates. A typical prior device is an assembly of transistors having a number of individual input terminals and being connected together to a single output to emit a signal when all of the inputs are energized. However, with this unit, and with other similar prior units in general, the circuit must be energized continuously and if there is a momentary power interruption, an error will occur. In addition, because a relatively large number of components, including transistors or tubes, are required, the cost of the unit (for a given capability) and the chance of failure are relatively high. The present invention is intended to minimize these difficulties.

In accordance with the present invention, in one specific embodiment thereof, there is provided and AND gate which uses multi-aperture magnetic cores (MAD cores) and connecting wire as its only components. For a unit with only two inputs and an output, only three cores are required, and the wiring of these cores is correspondingly simple and uncomplicated. Because long life passive components only, for example, wire and magnetic cores, are used as distinguished from active elements such as transistors, the reliablity of this new circuit is extremely high. Moreover, this new logic element can be powered from the same current supply as used with recently developed high efficiency equipment such as the shift-register described and claimed in U.S. Patent No. 2,995,731. Thus, the two are easily compatible.

A better understanding of the invention together with a fuller appreciation of its many advantages will best be gained from the following description given in connection with the single figure of the drawing which shows an AND gate embodying features of the invention.

The circuit 10 shown in the drawing includes two O (odd) cores 11 and 13 respectively, and a single E (even) core 16, each of a suitable magnetic material, such as ferrite. O core 11 has an input winding 18 looped through a minor aperture 20 and an output winding 22 looped twice through another minor aperture 24. This latter winding encircles once the inner leg of E core 16 at its minor aperture 26. Similarly, O core 13 has an input winding 28 through one minor aperture 30 and an output winding 32 looped twice through its other minor aperture 34. The latter also encircles one time the inner leg of core 16 at aperture 26. E core 16 has a single output winding 36 threaded a suitable number of times (e.g. twice) around the outer leg of the core at minor aperture 26.

Each of the O cores is threaded through its major or central aperture, in the sense shown, by a suitable number of turns (here shown as a single wire) of an "Adv. O to E" drive winding 38. In like manner, E core 16 is threaded by an "Adv. E to O" drive winding 40. Finally, the minor apertures 24 and 34 of the O cores and the minor aperture 26 of the E core are threaded in the relative sense shown, by a suitable "prime" or drive winding 42.

The sequence of energization by current pulses of the various drive windings is explained in detail in the aforesaid co-pending patent application. Briefly, this order is as follows: Prime, Adv. O to E, Prime, Adv. E to O, and so on. Now, assuming all the cores to be in the clear state wherein they are saturated with flux in the clockwise direction, and if in the interval between the last Adv. E to O current and the next prime current, either or both of input windings 18 and 28 receive a signal sufficient to set its respective O core at apertures 20 and 30, the flux so set will cause flux to be set around the corresponding output minor aperture 24 or 34. In this condition the inner leg of the core at the output minor aperture, for example, core 11 at minor aperture 24 will be saturated with flux in the counterclockwise direction, while the outer leg remains saturated in the clockwise or clear direction. Thereafter, the prime current applied to winding 42 will reverse or "prime" the flux set around these minor output apertures. Then, when the next Adv. O to E pulse appears on winding 38, the primed flux at either or both of minor apertures 24 and 34 will be "cleared," the reversal of the flux in the outer leg of the core at a minor aperture causing a current to flow in its corresponding output or coupling windings 22 or 32. Now, by making the resistance of each of the latter windings of sufficient magnitude, the current which is caused to flow in it can be limited in magnitude. By keeping the current which can flow in each winding at only half, for example, the value necessary to set flux around minor aperture 26 of E core 16, neither current in winding 22 nor in winding 32 by itself can set flux in core 16. But current simultaneously flowing in both windings will be able to set flux in core 16. However, this can happen only if the input aperture 20 of O core 11 and the input aperture of 30 of O core 13 had been set with flux during the required interval.

Once flux is set around minor aperture 26 of the O core, an output signal will be developed on output lead 36 by the subsequent occurrence of a prime current and an Adv. E to O current. The latter current causes flux to switch only in the outer leg of core 16 at aperture 26 and there is no loading of the drive winding nor of the output winding 36 by windings 22 and 32, since the latter windings do not encircle the outer leg of the core. An additional benefit of this arrangement is that should the current flowing in one coupling winding, for example winding 22, and not in the other, reach a sufficient magnitude to set flux in core 16, induced current will be generated in winding 32 in such a direction as to oppose flux setting, thus further reducing the ability of a single current to set appreciable flux around minor aperture 26. Also, the ranges of temperature and magnitude of drive currents over which this circuit operates satisfactorily are very wide, being effectively the same as for the shift register disclosed in the aforesaid patent application.

It should be appreciated that in circuit 10 an additional core or cores can be connected in parallel with the two O cores shown to give three or more inputs to the circuit. In this event the resistance of each coupling winding, such as windings 22 and 32, must be adjusted so that simultaneous currents in all but one winding are insufficient to set flux around minor aperture 26, but so that currents in all windings at once are sufficient to set flux.

By making each of windings 22 and 32 with low enough resistance so that current in each by itself can set flux around minor aperture 26, circuit 10 will operate as an OR gate. As thus modified, an input signal appearing at the proper time at any input of the circuit will cause a signal at the output.

The above description is intended in illustration and not in limitation of the invention. Various changes or modifications in the embodiment set forth may occur to those skilled in the art and can be made without departing from the spirit or scope of the invention as set forth. In particular, direct current of proper amplitude can be continuously applied to drive winding 42 to prime the circuit at the required times.

In a circuit substantially identical to circuit 10 which has been built and successfully operated, the cores 11, 13, and 16 were about the size of a small shirt button and were made of General Ceramics No. 5209 ferrite material. Each of windings 22 and 32 was of No. 38 A.W.G. copper wire, 3.5 inches long. Approximately 15 ampere-turns of advance drive, and about ½ ampere-turn of D.C. prime drive were found to be satisfactory.

I claim:

1. A logic circuit comprising at least two input cores and an output core, each core being of magnetic square-loop material and having a large central aperture, said output core also having a minor aperture, input signal means to set flux in each of said input cores, a plurality of coupling windings each linking a respective input core and one leg of said output core at said minor aperture, an output winding encircling the other leg of said output core at said minor aperture, a first drive winding linking said input cores, a second drive winding linking said output core, and a prime winding through said minor aperture of said output core to reverse flux set therearound by said coupling windings.

2. The circuit in claim 1 wherein the impedance level of each of said coupling windings is equal and is great enough so that currents simultaneously in all but one winding fail to set said output cores but currents simultaneously in all windings are able to set flux therein.

3. The circuit in claim 2 wherein each of said coupling windings has a resistive impedance determined by its length, each winding being of fine gage copper wire.

4. In a logical circuit of the character described, an output saturable magnetic core having a central aperture and a minor aperture, coupling winding means threading said minor aperture, a plurality of input magnetic flux means for causing currents of different levels to flow in said coupling winding means, each of said flux means having a separate input adapted to be energized by a respective input signal, an output winding coupled to said minor aperture, a drive winding to saturate said core in the clear direction, and a prime winding through said minor aperture to reverse flux set therearound, the total current flowing in said coupling winding means when all of said inputs have been energized being sufficient to set flux around said minor aperture, said total current being insufficient to set flux around said minor aperture if one or more of said inputs have not been energized.

5. A logic circuit comprising at least two input cores and an output core, each core being of magnetic ferrite material and having a large central aperture and a minor aperture, input signal means to set flux in each of said input cores, a plurality of coupling windings each linking a respective minor aperture of an input core and a leg of said output core at its minor aperture, an output winding encircling a leg of said output core at its minor aperture, a first drive winding linking said input cores, a second drive winding linking said output core, and a prime winding through said minor apertures of said input and output cores to reverse flux set locally therearound.

References Cited by the Examiner

UNITED STATES PATENTS

| | | | |
|---|---|---|---|
| 2,297,220 | 3/60 | Crane | 340—174 |
| 3,030,519 | 4/62 | Crane | 340—174 |

OTHER REFERENCES

Pages 63–73, January 1959, Publication I: Proceedings of the IRE.

Pages 321–332, March 1956, Publication II: Proceedings of the IRE.

IRVING L. SRAGOW, *Primary Examiner.*